United States Patent [19]
Lefavour et al.

[11] Patent Number: 5,924,828
[45] Date of Patent: Jul. 20, 1999

[54] DRILL FOR A RAILROAD RAIL HAVING A FOUR POSITION AND SIX WAY HYDRAULIC CONTROL VALVE

[75] Inventors: John D. Lefavour, Litchfield; Armand T. Montminy, Manchester, both of N.H.

[73] Assignee: Framatome Connectors USA Inc., Fairfield, Conn.

[21] Appl. No.: 09/072,292

[22] Filed: May 4, 1998

[51] Int. Cl.⁶ .................................................. B23B 45/04
[52] U.S. Cl. .................... 408/130; 91/436; 137/625.21
[58] Field of Search .................. 91/28, 436; 137/625.21; 408/130, 702, 17, 124

[56] References Cited

U.S. PATENT DOCUMENTS

| | | | |
|---|---|---|---|
| 2,108,182 | 2/1938 | Searle | 137/625.21 |
| 2,692,660 | 10/1954 | Good et al. | 408/130 |
| 2,932,192 | 4/1960 | Hansen | 408/130 |
| 3,145,588 | 8/1964 | King | 408/130 |
| 3,556,151 | 1/1971 | Masuda | 137/625.21 |
| 3,796,232 | 3/1974 | Dalton | 137/625.21 |
| 5,295,770 | 3/1994 | Pennison et al. | 408/130 |

OTHER PUBLICATIONS

"Hydraulic Railway Maintenance of Way Tool Guide", Stanley Hydraulic Tools, 28 pages, Jul. 1995.
Enerpac Catalog, 3–Way Directional Control Valves and 4–Way Directional Control Valves, pp. 116–119.
Power Team Catalog, Valves For Double–Acting Cylinders, Manually Operated, p. 77.

*Primary Examiner*—Daniel W. Howell
*Attorney, Agent, or Firm*—Perman & Green, LLP

[57] ABSTRACT

A hydraulically powered tool having a motor, a pump, and a hydraulic directional flow control valve. The valve has a frame and a rotatable spool with flow channels. The valve is provided as a four position, six way valve to provide four operational conditions for the tool including NEUTRAL, DRILL, RETRACT and FAST FORWARD.

17 Claims, 7 Drawing Sheets

DRILL FOR A RAILROAD RAIL HAVING A FOUR POSITION AND SIX WAY HYDRAULIC CONTROL VALVE

BACKGROUND OF THE INVENTION

1. Field of the Invention

The present invention relates to a hydraulic control valve and, more particularly, a four position and six way valve used in a hydraulically powered drill.

2. Prior Art

The Stanley Works produces a tool known as the Stanley RD11 Rail Drill which has a hydraulically powered drill, a rail clamp, and a lever actuated hydraulic control valve. The control valve has four operational positions including neutral, drill, retract and fast forward. Three position, three way and three position, four way directional control valve are well known in the art.

SUMMARY OF THE INVENTION

In accordance with one embodiment of the present invention a hydraulic tool is provided comprising a hydraulically driven motor, a hydraulic pump and a hydraulic directional flow control valve connected between the motor and the pump. The valve has a frame with at least six flow conduits and a flow directing member movably mounted to the frame. The flow directing member is movable on the frame among at least four different flow positions to selectively interconnect the six flow conduits to provide at least four different operating conditions for the tool.

In accordance with another embodiment of the present invention a hydraulic flow control valve is provided comprising a manifold and a flow directing member. The manifold has hydraulic flow conduits connected hydraulic flow inlets and outlets to six directional flow holes of the manifold. The flow directing member is movably mounted to the manifold among four positions. The flow directing member comprises means for selectively directing flow among the six holes in the manifold. The valve is a four position and six way valve.

In accordance with another embodiment of the present invention a hydraulic railroad rail drilling tool is provided comprising a frame, a hydraulically driven motor, a drill bit connected to the motor, and a hydraulic directional flow control valve connected to the motor and connectable to a hydraulic pump. The hydraulic directional flow control valve has a moveable flow directing member with at least five separate channels. The valve is adapted to provide at least four different operating conditions for the drill comprising neutral, drill, retract and forward fast movement of the drill bit.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
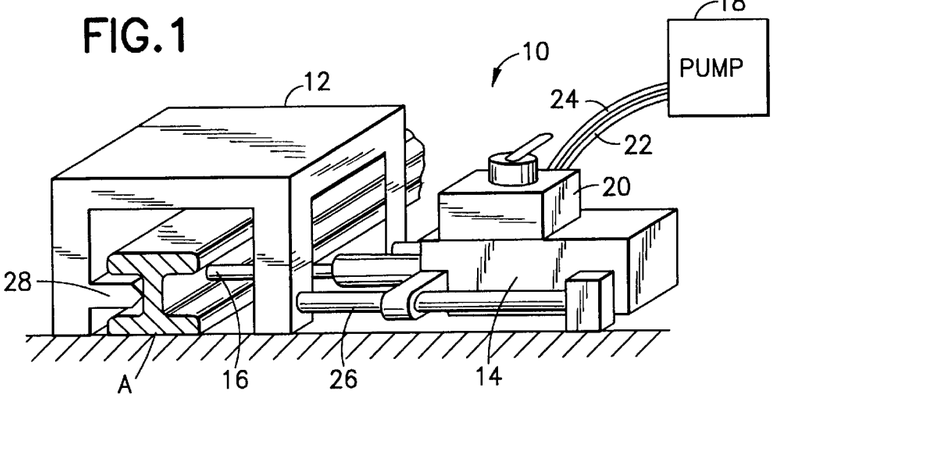
FIG. 1 is a schematic perspective view of a tool incorporating features of the present invention.

Referring to FIG. 1, there is shown a perspective view of a tool 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The tool 10, in the embodiment shown, is a hydraulically driven drill for drilling a hole through a railroad rail A. However, in alternate embodiments, features of the present invention could be used on other types of hydraulically driven tools or other types of hydraulic devices. The tool 10 generally comprises a frame 12, a hydraulically driven motor 14, a drill bit 16, a hydraulic pump 18, and a hydraulic directional flow control valve 20. The pump 18 can be any suitable type of hydraulic pump. Two hydraulic lines 22, 24 provide a supply and return from the pump 18 to the valve 20. The valve 20 is mounted on the motor 14. The motor 14 is movably mounted on rails 26 of the frame 12. The frame 12 is adapted to rest on the ground and has a back support 28 for contacting the rail A.

Figure 1A:
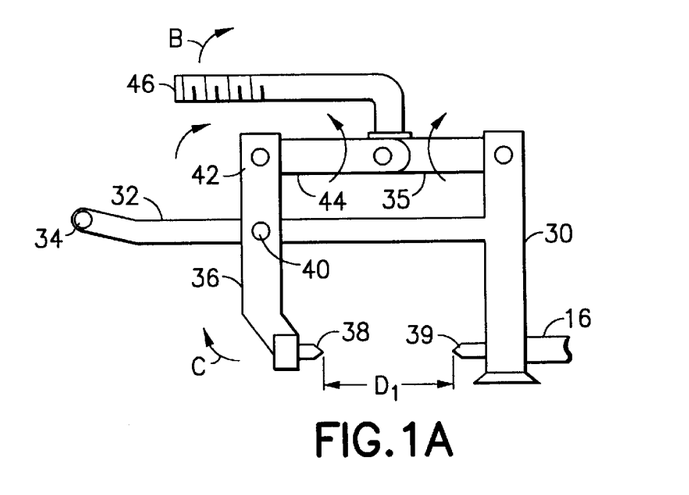
FIG. 1A is an elevational side view of a clamping portion of a frame of an alternate embodiment of the tool shown in FIG. 1.

Referring also to FIG. 1A a portion of the preferred embodiment of the frame is shown. The frame has a front support leg 30 for resting on the ground. A first arm 32 extends forward from the leg 30 and forms a front carry handle 34. A second arm 35 is pivotably mounted to the top of the leg 30. A rail back support 36 is provided is a bottom portion 38 for contacting the rail, a middle portion 40 pivotably connected to the first arm 32, and a top portion 42. A third arm 44 is pivotably connected between the top portion 42 and the second arm 35. The second arm 35 includes a lever handle 46. The distance $D_1$ between the bottom portion 38 and the rail contact portion 39 on the leg 30 can be enlarged (to pass over the top head of the rail) by moving the handle 46 as indicated by arrow B. Moving the handle 46 as indicated by arrow B causes the back support 36 to pivot at the middle portion 40 and move the bottom portion 38 outward as indicated by arrow C.

Figure 2A:
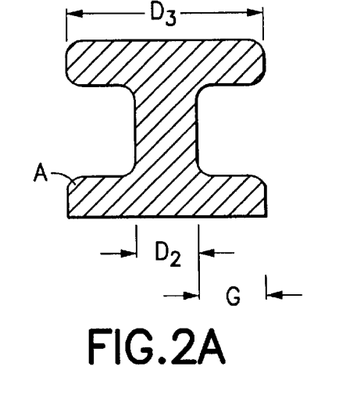
FIG. 2A is a cross-sectional view of a first type of railroad rail.
Figure 2B:
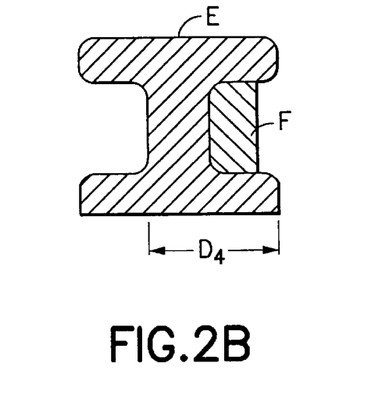
FIG. 2B is a cross-sectional view of a second type of railroad rail.

Referring also to FIGS. 2A and 2B, two types of rails are shown. The rail A has a center web width $D_2$ and a head width $D_3$. The rail E is similar, but also has an aluminum section F as an electrical conductor. This forms an enlarged web width $D_4$. The front tip of the drill bit 16, in it rear most position needs to be able to fit past the head of the rail and accommodate the web widths $D_3$, $D_4$ of both types of rails A, E. Thus, when drilling rail A, the front of the drill bit will need to move a minimum predrilling distance G before it can start drilling a hole in the center web.

Figure 3:
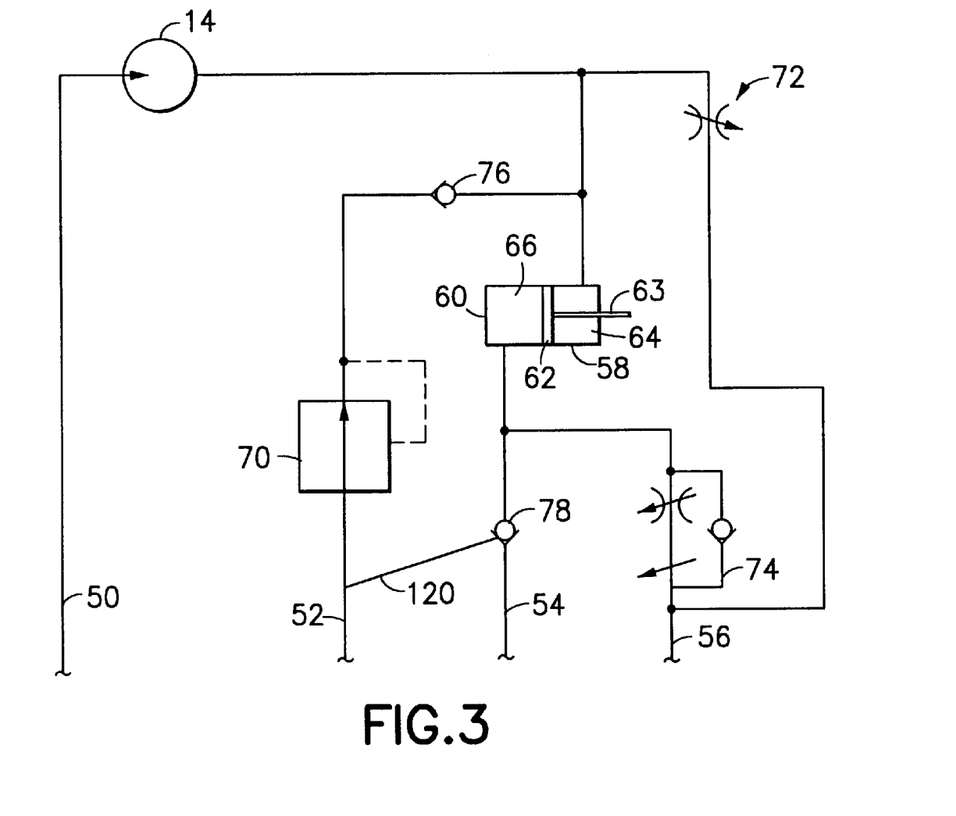
FIG. 3 is a schematic diagram of part of the hydraulic system of the tool shown in FIG. 1.

Referring to FIG. 3, a schematic diagram of part of the hydraulic system of the tool is shown. The four main hydraulic supply and return lines 50, 52, 54, 56 are connected by the valve 20 to the supply and return lines 22, 24 from the pump 18 (see FIG. 1). The tool has a drill bit advancer 58 for longitudinally moving the drill bit 16 (see FIG. 1) forward and backward. The advancer 58 includes a hydraulic cylinder 60 and a hydraulic piston 62 located in the cylinder 60. The piston 62 is connected to the drill bit by a rod 63. The piston 62 forms two chambers 64, 66 in the cylinder 60. Moving hydraulic fluid into and out of the chambers 64, 66 moves the piston 62 to thereby move the drill bit 16 forward and backward. The tool also includes a pressure reducer 70, a flow control 72, a flow regulator 74, and two check valves 76, 78. Further description of the hydraulic system shown in FIG. 3 will be made below after a description of the valve 20.

Figure 4:
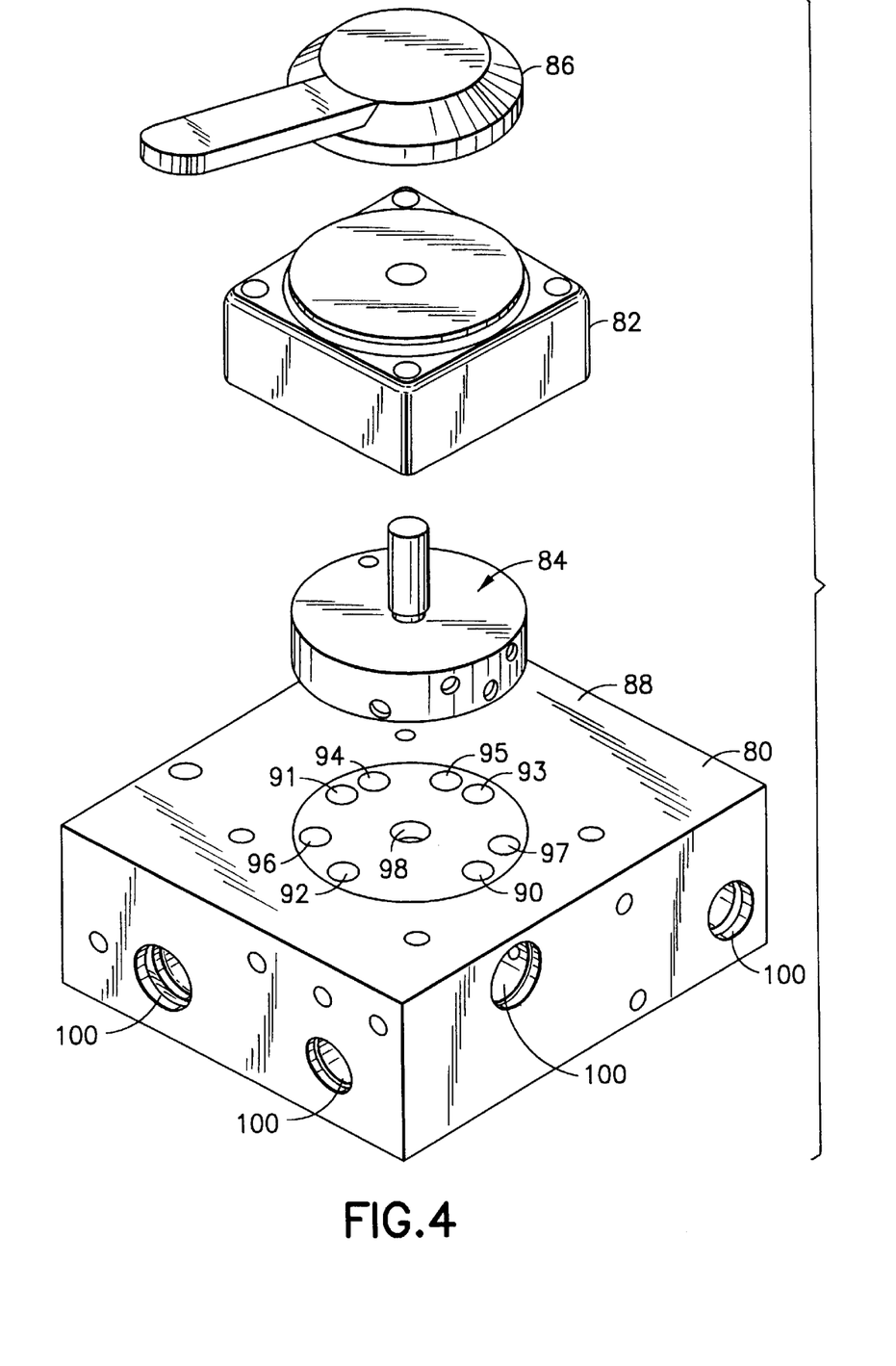
FIG. 4 is an exploded perspective view of the valve shown in FIG. 1.
Figure 4A:
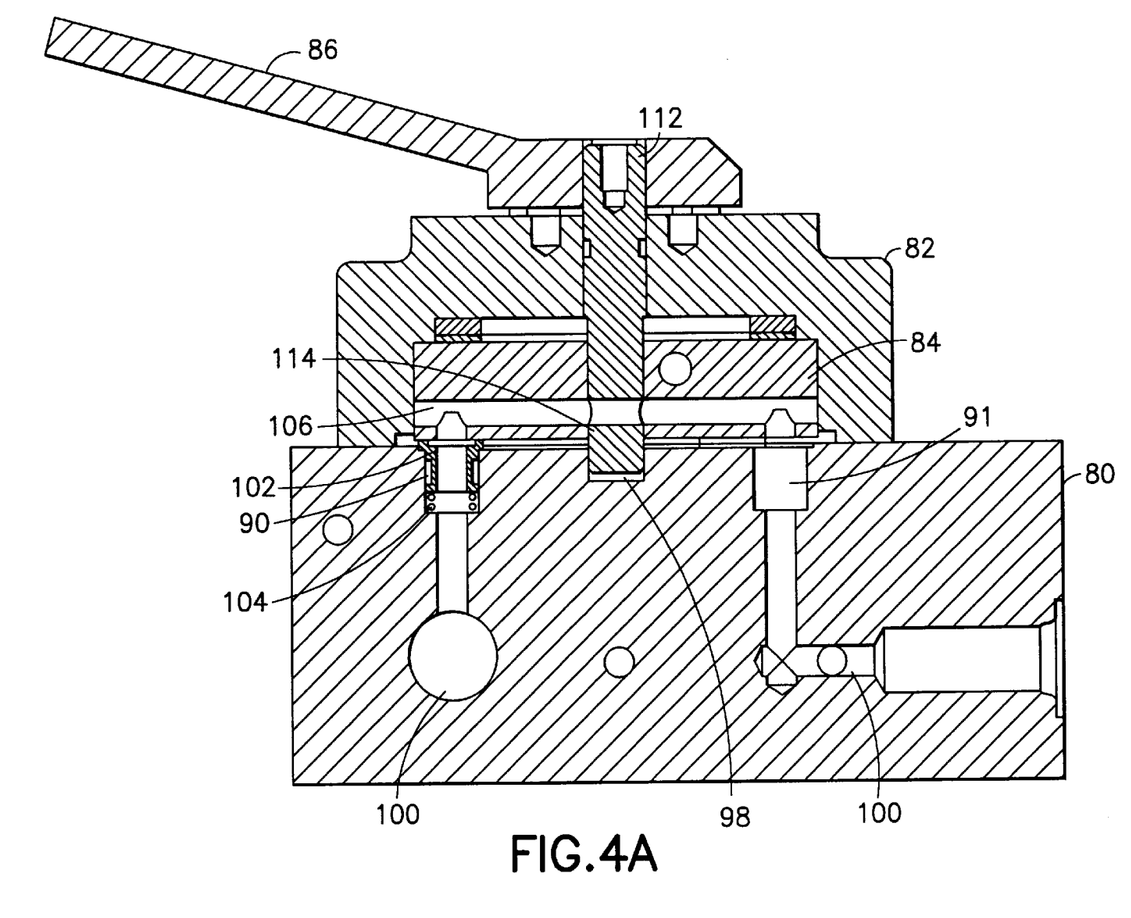
FIG. 4A is a cross-sectional view of the valve shown in FIG. 4.
Figure 4B:
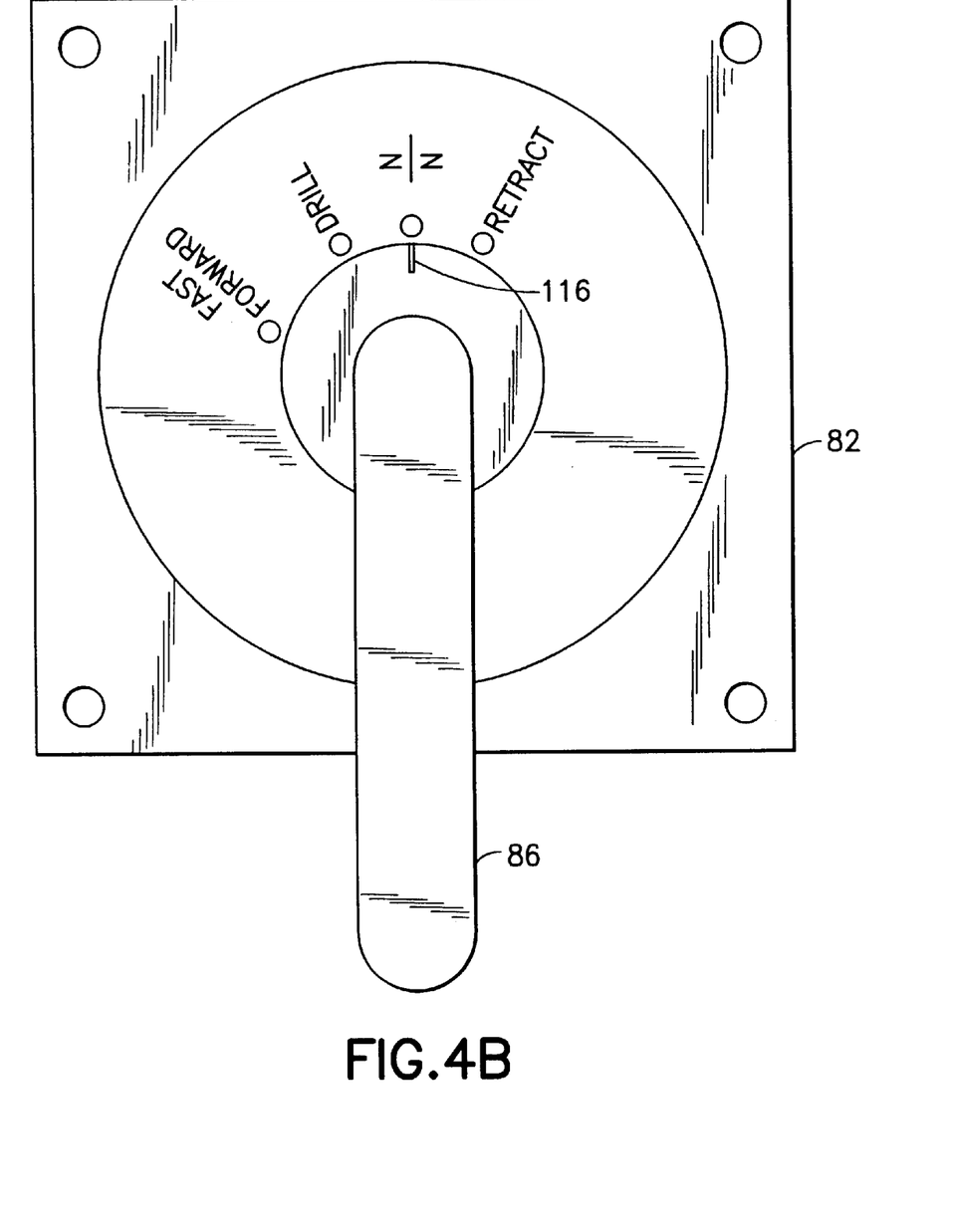
FIG. 4B is a top plan view of the handle and cap of the valve shown in FIG. 4.

Referring to FIGS. 4, 4A and 4B, the valve 20 generally comprises a frame with a manifold 80 and a cap 82, a spool 84 and a handle 86. The manifold 80 has a side 88 with six conduit holes 90, 91, 92, 93, 94, 95, two blind holes 96, 97, and a pivot post mounting hole 98. The lateral sides of the manifold 80 have holes into the separate conduits 100 connected to the holes 90–95. The blind holes 96, 97 do not connect to the conduits 100, but are merely closed holes. The blind holes 96, 97 and five of the conduit holes 90 and 92–95 have tubes 102 located therein and biased against the bottom of the spool 84 by springs 104. The second conduit hole 91 does not have a tube therein. The spring biased tubes 102 are used to form conduiting seals between the channel 106–110 and the holes 90 and 92–97 when selectively aligned. The second hole 91 does not have a sealing tube because it is connected to the return line 24. Thus, any fluid that travels out of the spool 84, into the spool receiving area in the cap, returns to the pump 18. The spool 84 has five channels 106–110 therein with entry and exit holes on the bottom side of the spool. Some of the channels 106–110 are located at different heights on the spool such that they can cross paths, but do not intersect each other. End plugs 111 are used to plug most of the lateral side holes formed when the channels are drilled into the spool. End plugs are not used on the first channel 106 such that the hydraulic fluid can lubricate the spool. A shaft 112 connects the handle 86 to the spool 84. The shaft 112 extends through the cap 82 and has a bottom end 114 located in the mounting hole 98. The cap 82 is stationarily attached to the manifold 80 to rotatably capture the spool 84 therebetween. As seen in FIG. 4B, the cap 82 has four markings to indicate the operational position of the valve relative to drill bit movement; N for NEUTRAL, DRILL for the drill bit being both rotating and pushed forward, FAST FORWARD for a relatively fast movement of the drill bit forward against the side of the railroad rail, and RETRACT for a relatively fast movement of the drill bit rearward away from the railroad rail. The RETRACT and DRILL positions are about 22° apart from the N position. The RETRACT and the FAST FORWARD positions are about 90° apart. The handle 86 has a marking 116 to indicate position of the spool 84. Preferably a limit is provided between the handle 86 and the cap 82 to prevent the handle 86 from being rotated past the RETRACT and FAST FOR-WARD positions. In addition, a detent mechanism is also preferably provided between the handle 86 and the cap 82 to positively locate the handle and spool at the four selectable positions.

Referring now to FIGS. 3, 4, 4A, 4B and 6A, the valve 20 will be described at its NEUTRAL position. In this position the first channel 106 of the spool 84 connects the first and second conduit holes 90 and 91. Conduit hole 90 is connected by the manifold 80 to the supply line 22 from the pump 18 (see FIG. 1). Conduit hole 91 is connected by the manifold 80 to the return line 24 to the pump 18. Thus, no hydraulic fluid is being pumped to the main lines 50, 52, 54, 56 from the valve 20.

Figure 6A:
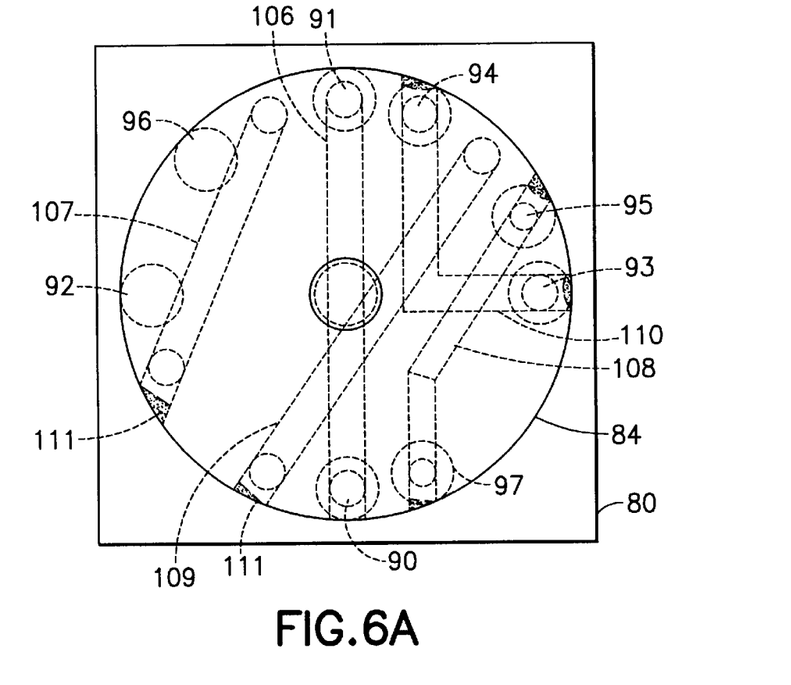
FIG. 6A is a schematic diagram showing position of the channels in the spool relative to the holes in the manifold of the valve shown in FIG. 4 at a NEUTRAL position of the valve.
Figure 6B:
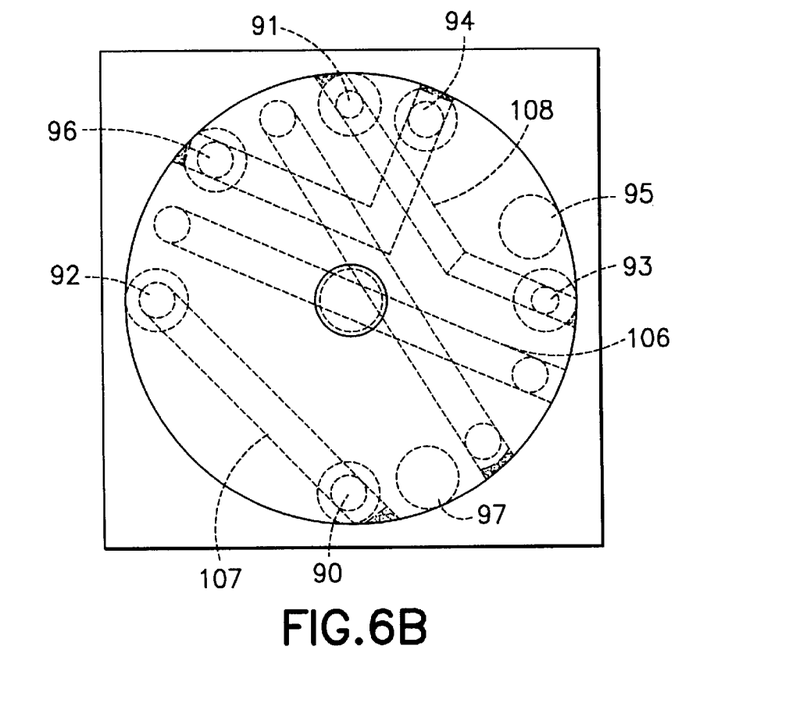
FIG. 6B is a schematic diagram as in FIG. 6A when the valve is at a FAST FORWARD position.

As illustrated by FIG. 6B, when the handle 86 is moved to the FAST FORWARD position, the second channel 107 of the spool connects the first hole 90 (connected to the supply line 22) to the third hole 92. The third hole 92 is connected by the manifold 80 to the second main line 52 (see FIG. 3). The third channel 108 of the spool 84 connects the fourth hole 93 to the second hole 91. The fourth hole 93 is connected by the manifold 80 to the third main line 54. A pilot pressure hole 120 is provided between the second main line 52 and the check valve 78 in the third main line 54. Hydraulic fluid is pumped through the valve 20 into line 52. This causes the check valve 78 to open due to pressure from hole 120. Fluid flows from line 52 into pressure reducer 70 where its pressure is reduced, such as from 2000 psi to 200 psi. The reduced pressure fluid flows through check valve 76 and into the first chamber 64 of the advancer 58. This causes the piston 62 and the rod 63 to move toward chamber 66 thereby moving the drill bit 16 forward against the railroad rail. Fluid in second chamber 66 is able to escape through check valve 78 (opened by pressure from hole 120) through the third main line 54, through third channel 108, and back to the pump 18 by the return line 24. The operator can then rotate the handle 86 to the DRILL position.

Figure 6C:
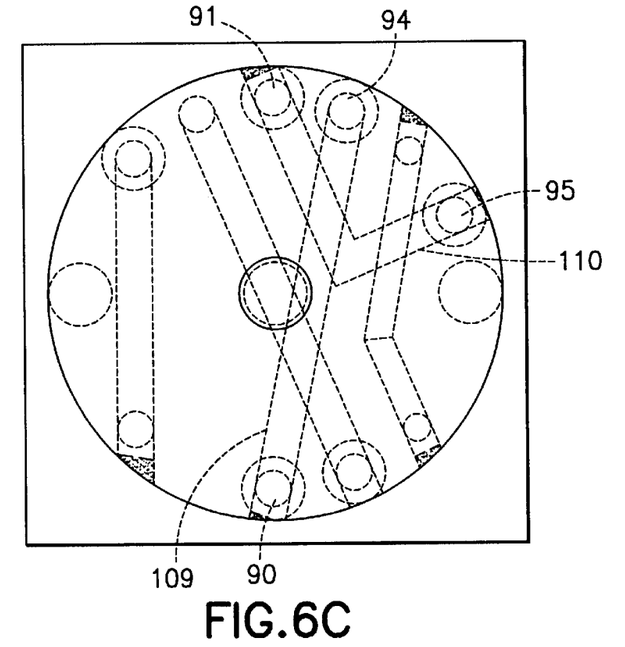
FIG. 6C is a schematic diagram as in FIG. 6A when the valve is at a DRILL position.

As illustrated in FIG. 6C, in the DRILL position the fourth channel 109 in the spool connects the first hole 90 to the fifth hole 94. The fifth hole 94 is connected by the manifold 80 to the first main line 50. The first main line 50 is connected to the motor 14. The fifth channel 110 in the spool connects the sixth hole 95 to the second hole 91. The sixth hole 95 is connected by the manifold to the fourth main line 56. Fluid flows from the pump 18, through line 22, through fourth channel 109, through the first main line 50 and into the motor 14. As fluid flows out of the motor 14 it takes two paths. Most of the fluid flows through the flow control 72 before exiting through fourth main line 56. The flow control 72 regulates the rate of flow of fluid to control the speed of the motor 14. Some of the fluid is diverted into the first chamber 64 of the advancer 58. Check valve 76 prevents this fluid from traveling to the pressure reducer 70. Force applied to the piston 62 causes the piston to move towards the second chamber 66. Fluid in the second chamber 66 is pushed out and into the flow regulator 74. Check valve 78 prevents the fluid from the second chamber 66 from exiting into the third main line 54. The flow regulator 74 limits or regulates the rate of flow from the second chamber 66 out the fourth main line 56 such that the drill bit has a relatively slow and steady forward movement. Thus, in the DRILL position the drill bit is being both rotated by the motor 14 and slowly pushed forward by the advancer 58.

Figure 6D:
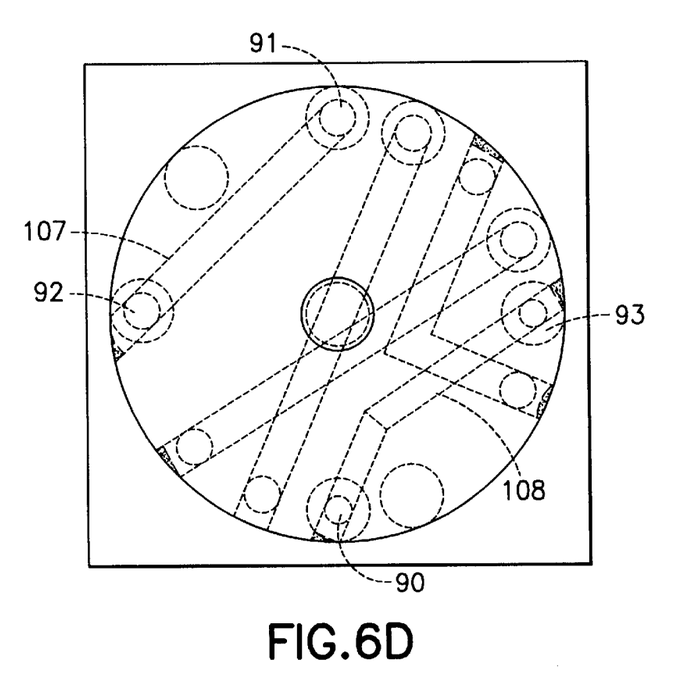
FIG. 6D is a schematic diagram as in FIG. 6A when the valve is at a RETRACT position.

As illustrated in FIG. 6D, when the spool 84 is in the RETRACT position the second channel 107 connects the second hole 91 to the third hole 92 and the third channel 108 connects the first hole 90 to the fourth hole 93. Thus, the supply line 22 from the pump 18 is connected to the third main line 54 and the second main line 52 is connected to the return line 24 to the pump 18. Fluid is pushed into the second chamber 66 of the advancer 58 to thereby move the piston 62 quickly towards the first chamber 64. This quickly moves the drill bit to its fully retracted position for removing the tool from the rail A or cleaning shavings out from between the drill bit and the rail. Pilot hole 120 allows excess fluid to pass to the second main line 52 and out the valve 20 (through channel 107) to the return line 24. In addition, fluid flows out of the chamber 64 through valve 72 to main line 56.

Figure 5:
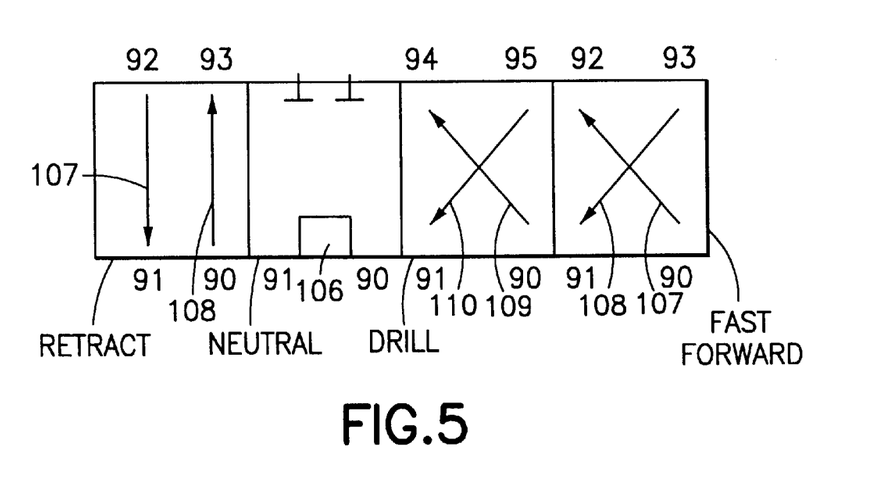
FIG. 5 is a schematic flow diagram of the four positions and fluid flow paths of the valve shown in FIG. 4.

Referring now to FIG. 5, a schematic flow diagram showing the four positions and fluid flows is shown as blocks and arrows. For the RETRACT position, channel 108 connects hole 90 to hole 93 and channel 107 connects hole 92 to hole 91. For the NEUTRAL position, channel 106 connects hole 90 to hole 91. For the DRILL position channel 109 connects hole 90 to hole 94 and channel 110 connects hole 95 to hole 91. For the FAST FORWARD position, channel 107 connects hole 90 to hole 92 and channel 108 connects hole 93 to hole 91. Thus, the valve 20 is provided as a four position six way valve. As can be seen in FIGS. 6A and 6B the blind holes 96, 97 are sometimes connected to other holes. More specifically, in the NEUTRAL position shown in FIG. 6A the sixth hole 95 is connected to the second blind hole 97. Since the sixth hole 95 is connected to the fourth main line 56, this seals off the fourth main line 56 to restrict fluid flow. In the FAST FORWARD position shown in FIG. 6B, the fifth hole 94 is connected to the first blind hole 96. Since the fifth hole 94 is connected to the first main line 50, this seal off the entry into the first main line 50. Thus, in these two positions the motor 14 is prevented from rotating the drill bit.

The tool 10 is generally intended to be used on existing railroad tracks. In a situation such as in a subway, workers may have a very short period of time to drill a hole in a rail because of trains traveling on the tracks, such as ten minutes between trains. This is why the tool has been provided with the valve 20 which can rapidly move the drill bit into contact with the rail upon initial placement of the tool at the rail, and which can rapidly move the drill bit to a retracted position for fast removal of the tool from the rail. With the present invention a hole can be drilled in even a hardened rail in two minutes or less. This leaves the workers with plenty of time to place and remove the tool 10 between passage of trains. Should a problem occur, such as a train arriving early, the drill bit can be quickly retracted and the tool quickly removed from the track. The valve 20 could of course be used on other types of hydraulically driven devices or as any six way directional flow control situation. The valve could also be provided with more than four positions and/or more than six ways.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a hydraulic tool having a hydraulically driven motor, a hydraulic pump, and a hydraulic directional flow control valve connected between the motor and the pump, wherein the improvement comprises:

the valve being a frame with at least six flow conduits and a flow directing member movably mounted to the frame, wherein the flow directing member is movable on the frame among at least four different flow positions to selectively interconnect the six flow conduits to provide at least four different operating conditions for the tool.

2. A tool as in claim 1 wherein the flow directing member has at least five separate flow directing channels.

3. A tool as in claim 1 wherein the flow directing member comprises a spool rotatably mounted on the frame.

4. A tool as in claim 1 further comprising a drill bit connected to the drill motor, a hydraulically operated drill bit advancer for longitudinally moving the drill bit forward and backward, and a pressure reducer connected to a first one of the conduits and connected to a first hydraulic chamber of the drill bit advancer.

5. A tool as in claim 4 further comprising a check valve in a second one of the conduits between a second hydraulic chamber of the drill bit advancer and the flow directing member, and a pilot pressure channel connecting the first conduit to the check valve to open the check valve when pressurized hydraulic fluid is flowing through the first conduit.

6. A tool as in claim 4 wherein a hydraulic fluid output from the motor is connected to the first hydraulic chamber of the drill bit advancer.

7. A tool as in claim 6 wherein a check valve is connected to an output of the pressure reducer to prevent hydraulic fluid from the hydraulic fluid output of the motor from traveling into the pressure reducer.

8. A tool as in claim 1 wherein the tool further comprises a drill bit connected to the motor and a positioning frame connected to the drive motor which is sized and shaped to be located on a railroad rail such that the drill bit can drill into the rail.

9. A tool as in claim 8 wherein the four different operating conditions are based upon movement of the drill bit and comprise neutral, drill, retract and fast forward movements of the drill bit.

10. A hydraulic flow control valve comprising:

a manifold having hydraulic flow conduits connecting hydraulic flow inlets and outlets to six directional flow holes of the manifold; and a flow directing member movably mounted to the manifold among four positions, the flow directing member comprising means for selectively directing flow among the six holes in the manifold, wherein the valve is a four position and six way valve.

11. A valve as in claim 10 wherein the holes are located on one side of the manifold and the flow directing member comprises a spool rotatably mounted against the side of the manifold over the holes.

12. A valve as in claim 11 wherein the spool is rotatable only about 90° on the manifold.

13. A valve as in claim 10 wherein the means for directing flow comprises the flow directing member having five separate channels therethrough.

14. A valve as in claim 10 further comprising spring biased tubes located in at least five of the holes which are biased against the flow directing member.

15. A valve as in claim 10 further comprising a cap connected to the manifold and encasing the flow directing member between the manifold and the cap.

16. A valve as in claim 10 wherein the flow directing member comprises a one-piece spool member with all hydraulic fluid flow channels of the flow directing member therethrough, and wherein only the spool member needs to be moved relative to the manifold to provide the four positions.

17. In a hydraulic railroad rail drilling tool having a frame, a hydraulically driven motor, a drill bit connected to the motor, and a hydraulic directional flow control valve connected to the motor and connectable to a hydraulic pump, wherein the improvement comprises:

the hydraulic directional flow control valve having a movable flow directing member with at least five separate channels, wherein the valve is adapted to provide at least four different operating conditions for the drill bit comprising neutral, drill, retract and forward fast movement of the drill bit.

* * * * *